United States Patent [19]
Kaushik et al.

(10) Patent No.: US 7,433,299 B2
(45) Date of Patent: Oct. 7, 2008

(54) FAULT-TOLERANT UPDATES TO A DISTRIBUTED FIBRE CHANNEL DATABASE

(75) Inventors: Balakumar N. Kaushik, Sunnyvale, CA (US); Richard L. Hammons, Hollister, CA (US); Wai-Sze Tam, Cupertino, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 1352 days.

(21) Appl. No.: 10/056,823

(22) Filed: Jan. 24, 2002

(65) Prior Publication Data

US 2003/0137941 A1 Jul. 24, 2003

(51) Int. Cl.
*G06F 11/00* (2006.01)
(52) U.S. Cl. .................. 370/216; 709/203; 709/208
(58) Field of Classification Search .......... 370/217, 370/218, 219, 220, 221, 222, 223, 224, 225, 370/226, 227, 228; 709/208, 209, 210, 211, 709/203
See application file for complete search history.

(56) References Cited

U.S. PATENT DOCUMENTS

| | | | | |
|---|---|---|---|---|
| 5,619,644 | A * | 4/1997 | Crockett et al. ............... 714/45 |
| 5,729,527 | A * | 3/1998 | Gerstel et al. ............... 370/228 |
| 5,813,032 | A * | 9/1998 | Bhargava et al. ............. 711/130 |
| 5,883,939 | A * | 3/1999 | Friedman et al. ............... 379/9 |
| 5,901,327 | A * | 5/1999 | Ofek ............................. 710/5 |
| 6,021,113 | A * | 2/2000 | Doshi et al. ................. 370/228 |
| 6,044,367 | A * | 3/2000 | Wolff ............................. 707/2 |
| 6,202,067 | B1 * | 3/2001 | Blood et al. .................. 707/10 |
| 6,704,278 | B1 * | 3/2004 | Albert et al. ................. 370/216 |
| 6,819,654 | B2 * | 11/2004 | Soloway et al. ............. 370/238 |
| 6,823,349 | B1 * | 11/2004 | Taylor et al. ................ 707/204 |
| 6,954,436 | B1 * | 10/2005 | Yip et al. .................... 370/254 |
| 7,366,765 | B1 * | 4/2008 | Heideman et al. ........... 709/209 |
| 2002/0178238 | A1 * | 11/2002 | Fletcher et al. ............. 709/220 |
| 2003/0037029 | A1 * | 2/2003 | Holenstein et al. ............. 707/1 |
| 2005/0018619 | A1 * | 1/2005 | Banks et al. ................ 370/254 |
| 2006/0117212 | A1 * | 6/2006 | Meyer et al. ................... 714/4 |
| 2006/0123066 | A1 * | 6/2006 | Jacobs et al. ................ 707/202 |

OTHER PUBLICATIONS

Fibre Channel Switch Fabric—2 (FC-SW-2) Rev 5.3; NCTIS working draft proposed American National Standard for Information Technology; Jun. 26, 2001.
Fibre Channel Switch Fabric (FC-SW) Rev 3.3; NCITS working draft proposed American National Standard for Information Disclosure Technology; Oct. 21, 1997 (pp. beginning-20, 33-68 & 119-168).

* cited by examiner

*Primary Examiner*—Chi H. Pham
*Assistant Examiner*—Kevin Mew
(74) *Attorney, Agent, or Firm*—Wong, Cabello, Lutsch, Rutherford, & Brucculeri, LLP

(57) ABSTRACT

Fault tolerant techniques to update a distributed database in a switched-fabric network. A commit master switch initiates an update operation using a four-phase process that provides for the automatic fail-over to a second (or more) switches if the commit master should not complete the update operation. In response to a lost commit master switch, one or more switches may assume the role of the commit master to either abort or complete the update operation.

61 Claims, 6 Drawing Sheets

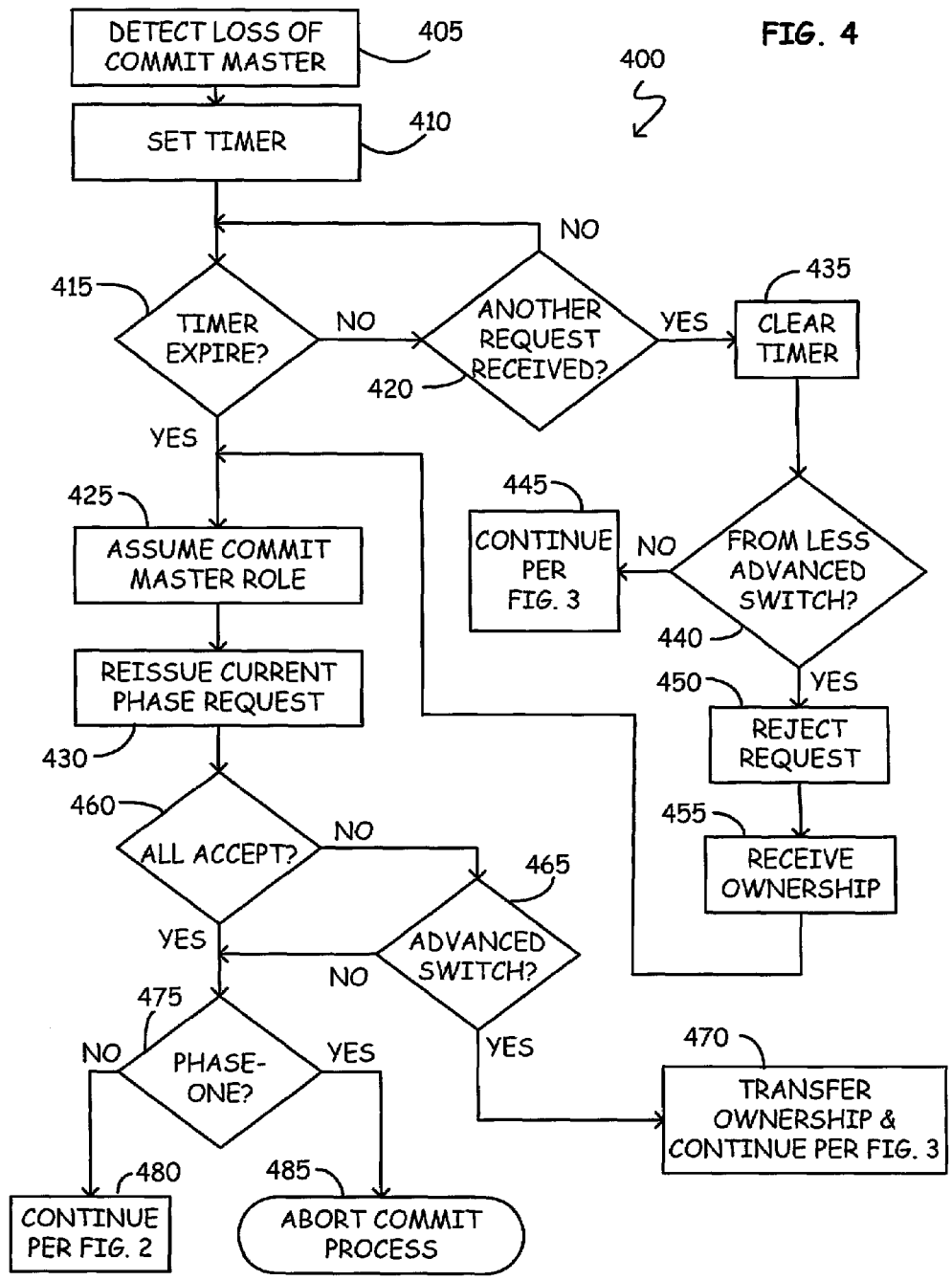

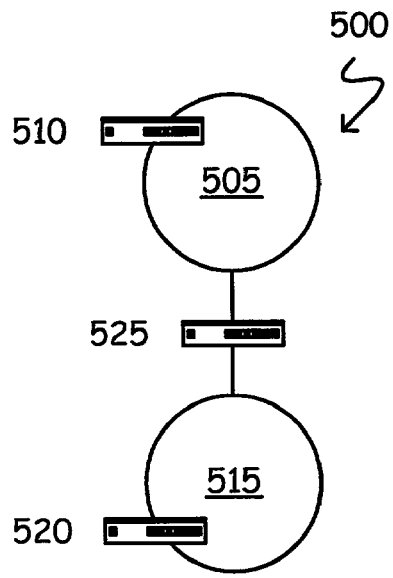
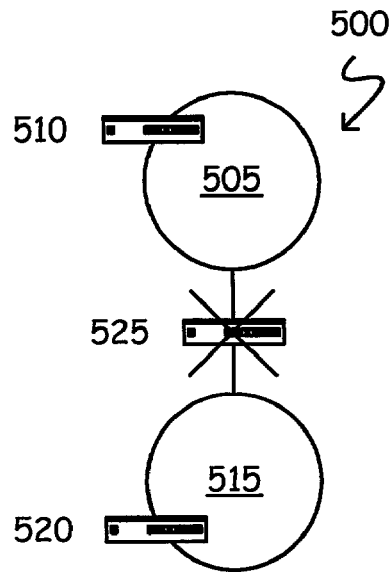
FIG. 5A  FIG. 5B
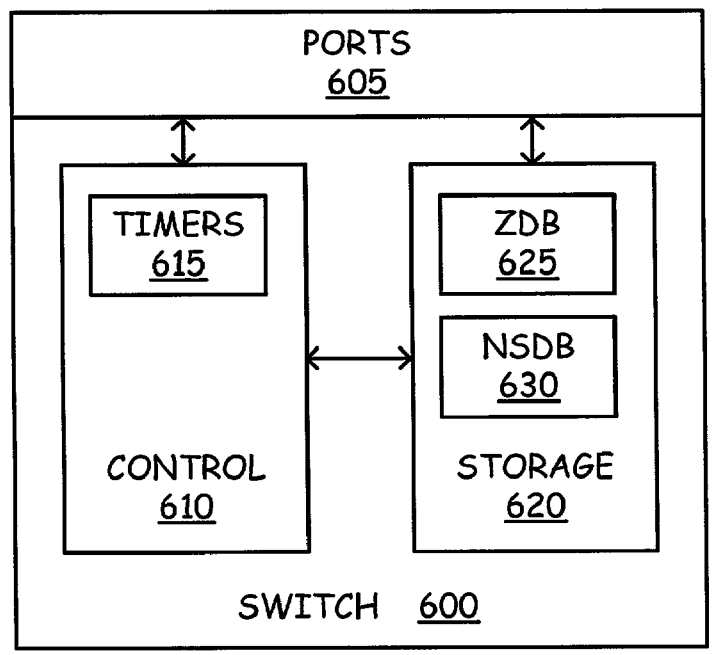
FIG. 6

FAULT-TOLERANT UPDATES TO A DISTRIBUTED FIBRE CHANNEL DATABASE

CROSS REFERENCE TO RELATED APPLICATIONS

This application is related to and incorporates by reference, U.S. patent application Ser. No. 09/426,567, entitled "A Method and System for Creating and Implementing Zones within a Fibre Channel System," by David Banks, Kumar Malavalli, Paul Ramsay, Kha Sin Teow, and Jieming Zhu, filed Oct. 22, 1999.

BACKGROUND OF INVENTION

The invention relates generally to the management of device information in a computer network and, more particularly but not by way of limitation, to providing fault tolerance for device information data-store update operations in a switched-fabric digital network.

One technology for providing high speed, low latency connectivity between devices is Fibre Channel. Developed as a high-performance serial link under the auspices of the American National Standards Institute (ANSI), Fibre Channel supports point-to-point, loop and fabric topologies at transmission rates in excess of one gigabit per second (Gbps). Based on the use of highly sophisticated switches, Fibre Channel has become the technology of choice for implementing high speed and highly reliable digital networks.

Referring to FIG. 1, illustrative Fibre Channel network 100 comprises servers 105, storage device or system 110 and databases 115 coupled to fabric 120. Fabric 120 itself comprises switches 125, 130 and 135. In addition to interconnecting individual components, a Fibre Channel network 100 may include a second (or more) fabrics 140 which itself may comprise one or more switches (not shown).

As Fibre Channel networks grew in scope and operational complexity, traditional techniques for managing their logical connectivity and security became unwieldy. Zoning provides one technique for a fabric to track, maintain and implement logical connectivity and security. (See the ANSI NCITS 321-1998 standard (FC-SW-2) entitled Fibre Channel Switch Fabric 2.) In a zoned fabric, various devices may be grouped into logical zones based on switch ports, device identities (for example, world-wide name, WWN), logical unit number (LUN) or other variations. Only devices within the same zone may be allowed to communicate with one another.

The information upon which zoning operates is typically maintained in a database (e.g., tables) replicated among a fabric's switches. Each switch maintains a copy of the information for the entire fabric. It is necessary that the zoning database be replicated reliably across all of the switches in the fabric in order to avoid inconsistent enforcement of device access control. When the zoning database is changed from one switch and when the changes are requested to be committed, these changes must be reliably sent to all of the switches in the fabric at that moment, regardless of fabric merges or partitions or routing changes. Should a switch fail after initiating, but before completing, such an update operation, the replicated zoning database could become inconsistent among the participating switches (i.e., they would no longer be exact replicas)—a query to one switch for information about a device could result in a different response than if that same query were made to a different switch. Such a situation could render the fabric partially or wholly unusable for continued device communication. Accordingly, it would be beneficial to provide a means (methods and devices) for fault tolerant inter-switch updates so that, should a fabric switch fail during a zoning database update operation, other fabric switch zoning databases are not corrupted.

SUMMARY OF INVENTION

In one embodiment, the invention provides a fault tolerant method to update a replicated database. The method includes sending a first message to a specified one or more devices, sending a second message to each of the specified one or more devices that accepted the first message, the second message including update data, sending a third message to each of the specified one or more devices that received the second message, updating the identified one or more entries in the database with the update data, and sending a fourth message to each of the specified one or more devices that accepted the third message.

In another embodiment, the invention provides a fault tolerant method to abort or complete a replicated database update operation should the initiating device be lost. The method includes detecting the loss of a commit master device, and resending a message previously received from the commit master to each of a specified one or more devices if any previously received message from the commit master device includes update data, else aborting the update operation. Techniques (methods and devices) for transferring commit master duties between switches and the ability for multiple switches to perform commit master functions are also described.

Other embodiments of the invention include Fibre Channel switches and networks of Fibre Channel switches adapted to perform the methods outlined herein.

BRIEF DESCRIPTION OF DRAWINGS

FIG. 4 shows a flow chart of a fault tolerant database update fail-over technique in accordance with the invention.

FIGS. 5A and 5B show a block diagram of an illustrative Fibre Channel fabric that loses a commit master during a database update operation and the resulting fabric configuration.

FIG. 6 shows a block diagram of a Fibre Channel switch in accordance with one embodiment of the invention.

DETAILED DESCRIPTION

Techniques (including methods and devices) to provide fault tolerant database update operations in a switched-fabric digital network are described. The following embodiments of the invention, described in terms of a Fibre Channel network, are illustrative only and are not to be considered limiting in any respect.

In one embodiment of the invention, if a switch fails after initiating, but before completing a database update operation, a second switch may cancel the operation to return the network to a known stable state. In another embodiment of the invention, if a switch fails after initiating, but before completing a database update operation, a second switch may attempt to complete the operation. In yet another embodiment of the invention, if a switch fails after initiating, but before completing a database update operation and the failed switch causes a fabric to be broken into two or more segments, switches in each of the segments may independently terminate or attempt to complete the update operation. Database update operations in accordance with various embodiments of the invention are initiated by a "Commit Master" (that switch which initiates a database change operation) using a four-phase communication process (the "Commit Process"), each phase of which can be mediated through a Fibre Channel exchange.

Figure 1:
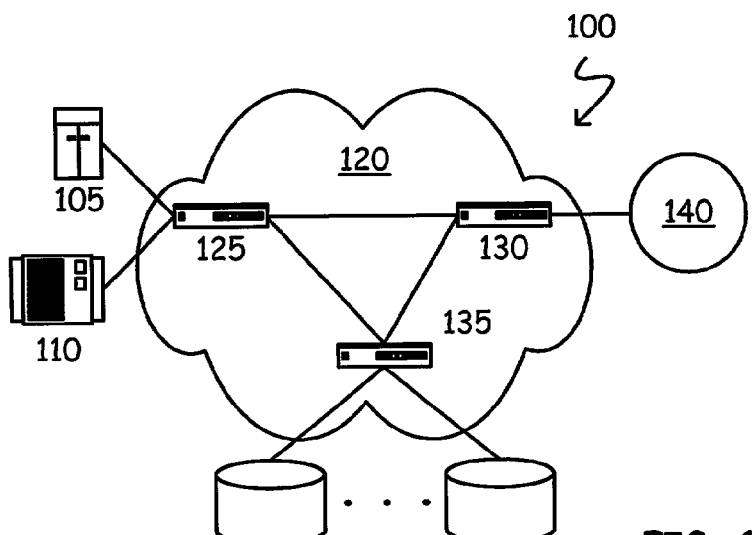
FIG. 1 shows a block diagram of an illustrative prior art Fibre Channel network.
Figure 2B:
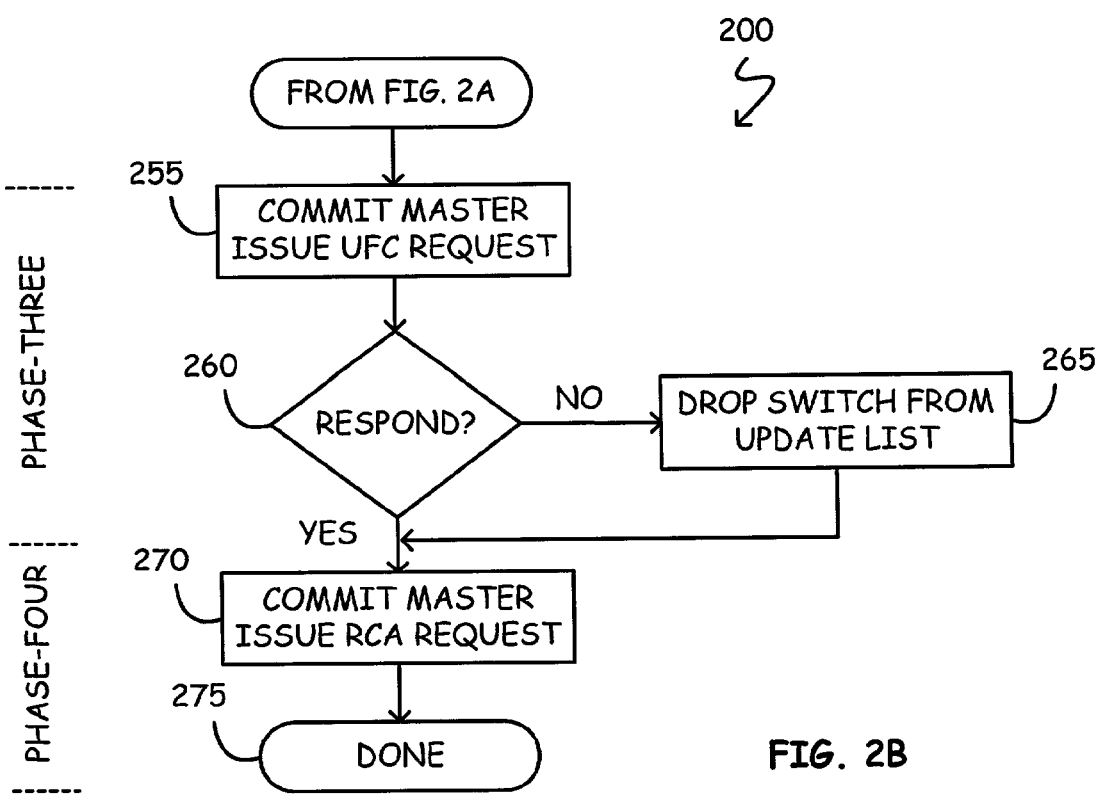
FIGS. 2A and 2B show a flow chart for one aspect of a fault tolerant database update operation in accordance with one aspect of the invention.
Figure 2A:
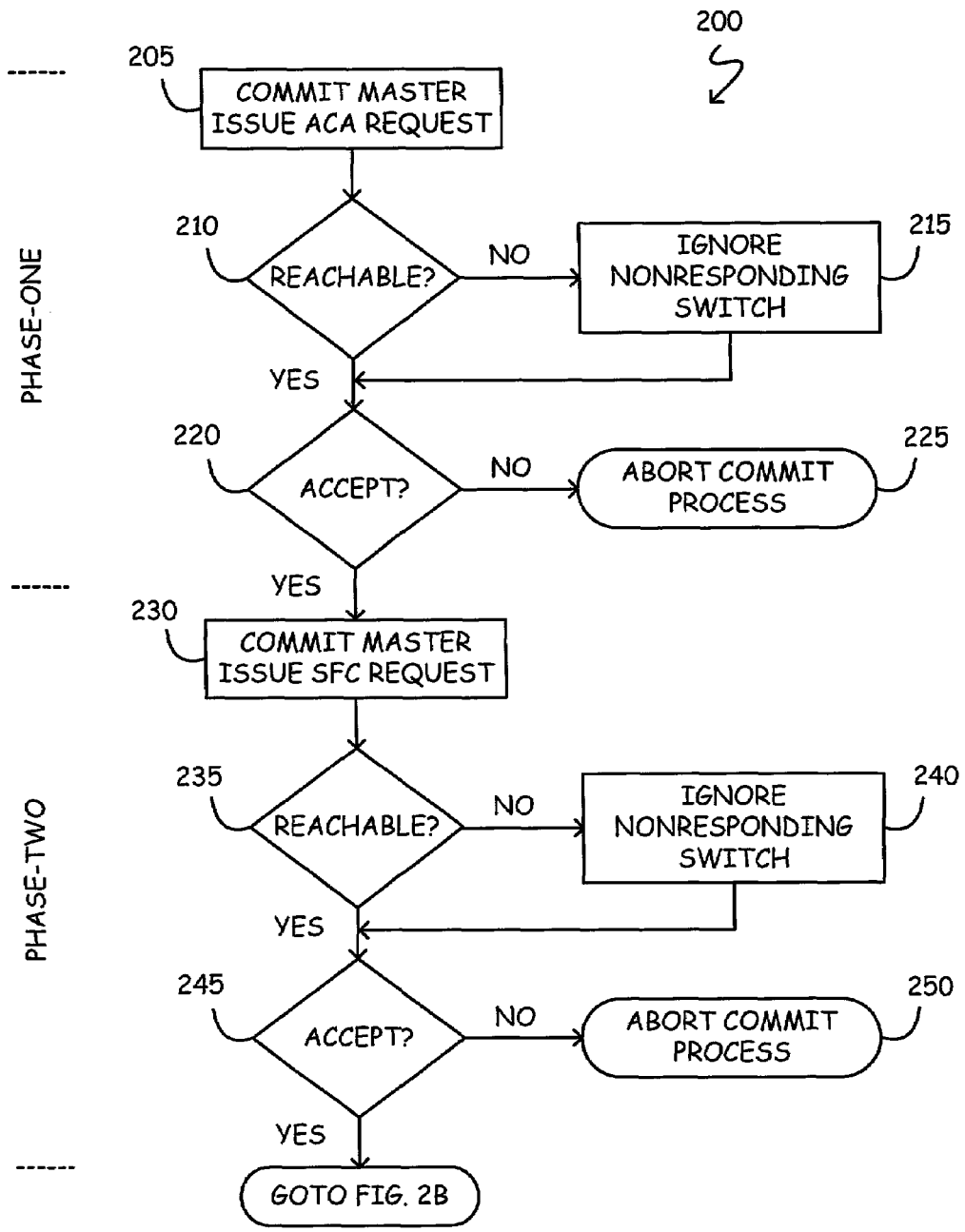

Referring to FIG. 2A, phase-one of Commit Process 200 begins when the Commit Master issues an Acquire Change Authorization (ACA) request to each switch in a fabric it wants to update (block 205). If a targeted switch is not reachable after a specified time or after the ACA request has been resent a specified number of times (the "no" prong of diamond 210), the Commit Master may remove the non-responding switch's identifier from the switch identifier list defined in Table 2 (block 215). If a switch rejects the ACA request, the Commit Master may send the ACA request to the rejecting switch a specified number of additional times. If at least one switch finally rejects the ACA request (the "no" prong of diamond 220), the Commit Master aborts the Commit Process (block 225) by, for example, issuing a Release Change Authorization (RCA) request.

In one embodiment, the Commit Master issues requests to each switch identified in the switch identifier list (see Table 2) in switch order. The switch identifier list could, for example, comprise all those switches physically coupled to the Commit Master. Alternatively, the switch identifier list could comprise all those switches in the same zone as the Commit Master. In one embodiment, the switch order corresponds to the switches sorted (high-to-low or low-to-high) world-wide name (WWN) identifiers. In another embodiment, the switch order corresponds to the switches sorted (high-to-low or low-to-high) domain identifiers.

Once a switch accepts the ACA request (the "yes" prong of diamond 220), it blocks any subsequently received fabric configuration change request whether related to, for example, zoning or security. Once the Commit Master has issued an ACA request it too blocks any subsequently received fabric configuration change request.

Table 1 defines an ACA request in accordance with one embodiment of the invention. Table 2 defines a commit exchange preamble in accordance with one embodiment of the invention. Table 3 shows a commit exchange accept message in accordance with one embodiment of the invention. Table 4 shows a commit exchange reject message in accordance with one embodiment of the invention.

TABLE 1

ACA Request

| Item | Size (Bytes) |
|---|---|
| Constant Value, e.g., 0 × 79 | 1 |
| Reserved | 1 |
| Message Length | 2 |
| Commit Exchange Preamble | N |

TABLE 2

Commit Exchange Preamble

| Item | Size (Bytes) |
|---|---|
| Transaction Identifier (a unique value that may comprise, or be derived from, one or more of the following: process identifier of the sending process; domain identifier of the issuing switch; world-wide name of the issuing switch; request timestamp) | 12 |
| Number of switches targeted to receive the request (M) | 1 |
| Reserved | 3 |
| Switch Identifier List (one identifier for each switch targeted to receive the request) | M × 12 |

TABLE 3

Commit Exchange Accept Message

| Item | Size (Bytes) |
|---|---|
| Constant value, e.g., 0 × 02000000 | 4 |

TABLE 4

Commit Exchange Reject Message

| Item | Size (Bytes) |
|---|---|
| Constant value, e.g., 0 × 01000000 | 4 |
| Reserved | 1 |
| Response Code (e.g., higher level indication of the request being rejected) | 1 |
| Reason Code (i.e., a more detailed indication of why the request is being rejected such as, for example, the switch is busy processing a prior update message) | 1 |
| Vendor Unique Code | 1 |

Phase-two of Commit Process 200 begins when the Commit Master issues a Stage Fabric Configuration (SFC) request to each switch that accepted its phase-one ACA request (block 230). Those switches accepting the Commit Master's phase-one ACA request may be identified in the SFC's switch identifier list (see Table 2). Table 5 defines a SFC request in accordance with one embodiment of the invention and, as shown, the SFC request contains the data that will be used to update a database entry (e.g., an entry in a Fibre Channel name server or zoning database). If a targeted switch is not reachable after a specified time or after the SFC request has been resent a specified number of times (the "no" prong of diamond 235), the Commit Master may remove the non-responding switch's identifier from the switch identifier and continue (block 240). If at least one reachable switch rejects the SFC request (the "no" prong of diamond 245), the Commit Master aborts the Commit Process by, for example, issuing a Release Change Authorization (RCA) request (block 250).

TABLE 5

SFC Request

| Item | Size (Bytes) |
|---|---|
| Constant value, e.g., 0 × 25 | 1 |
| Reserved | 3 |

TABLE 5-continued

| SFC Request | |
|---|---|
| Item | Size (Bytes) |
| Commit Exchange Preamble (see Table 2) | N |
| Data Length | 4 |
| Data | D |

Referring now to FIG. 2B, if all responding switches accept the SFC request (the "yes" prong of diamond 245), the Commit Master initiates phase-three by issuing an Update Fabric Configuration (UFC) message to those switches in switch order (block 255). Table 6 defines a UFC request in accordance with one embodiment of the invention. If any switch fails to respond to the Commit Master's UFC request within a specified period (the "no" prong of diamond 360), the nonresponding switch(es) may be dropped for the switch identifier list of phase-four (block 265). Since each switch preferably allocates all resources needed for phase-three during phase-two, no switch should reject the phase-three request. Once a switch accepts the Commit Master's phase-three UFC request, the database entry identified in the UFC request may be updated with the data provided in the SFC request (see Table 5).

TABLE 6

| UFC Request | |
|---|---|
| Item | Size (Bytes) |
| Constant value, e.g., 0 × 26 | 1 |
| Reserved | 3 |
| Commit Exchange Preamble (see Table 2) | N |

All switches responding to the Commit Master's UFC request (the "yes" prong of diamond 260), are issued a phase-four Release Change Authorization (RCA) message (block 270). Table 7 defines a RCA request in accordance with one embodiment of the invention. This completes a successful database update operation (block 275).

TABLE 7

| RCA Request | |
|---|---|
| Item | Size (Bytes) |
| Constant value, e.g., 0 × 22 | 1 |
| Reserved | 3 |
| Message Length | 2 |
| Commit Exchange Preamble (see Table 2) | N |

Figure 3A:
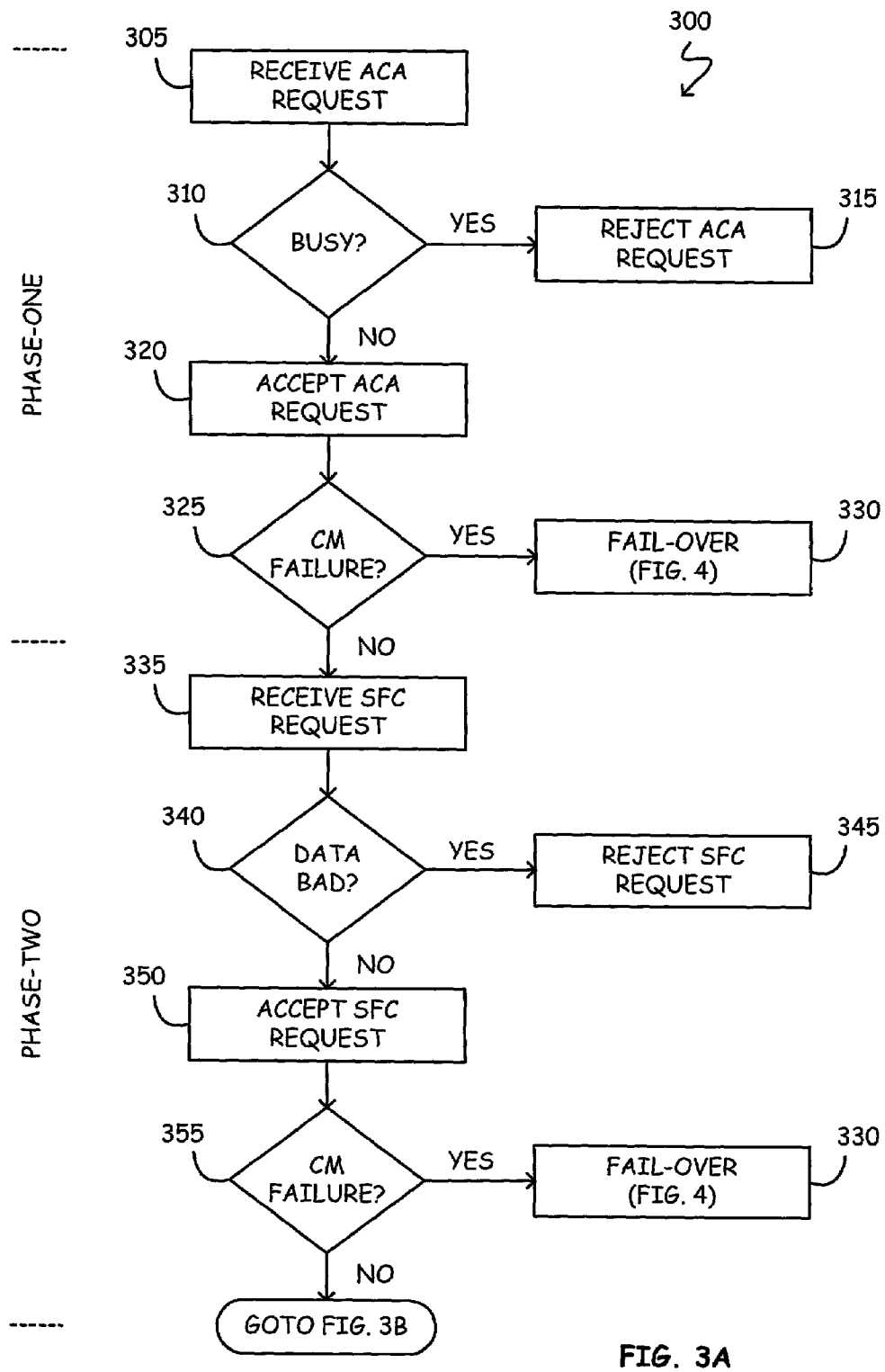
FIGS. 3A and 3B show a flow chart for another aspect of a fault tolerant database update operation in accordance with one aspect of the invention.
Figure 3B:
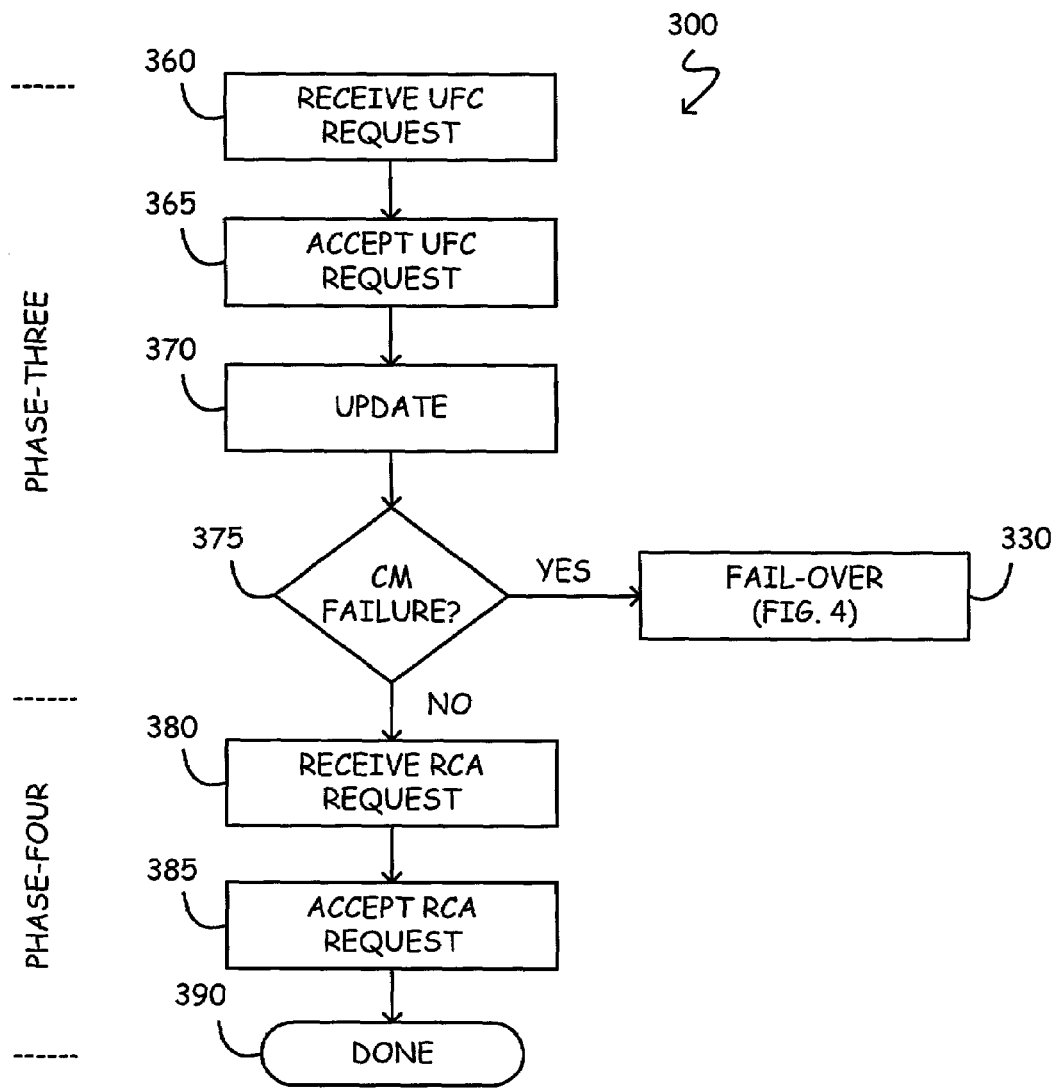

FIGS. 3A and 3B show Commit Process 300 from the perspective of a slave switch (i.e., non-Commit Master). Referring first to FIG. 3A, phase-one begins when a slave switch receives an ACA request from the Commit Master (block 305). The slave switch then determines if it is already busy processing an earlier initiated, but not yet completed, update operation (diamond 310). If the slave switch is already processing a prior initiated Commit Process (the "yes" prong of diamond 310), it issues a reject message (see Table 4) to the Commit Master (block 315). If the slave switch is not currently processing a prior initiated Commit Process (the "no" prong of diamond 310), it issues an accept message (see Table 3) to the Commit Master (block 320). At this time each slave switch may record the identity of the Commit Master, the identity of all the switches targeted for the update operation, and its position in the switch identifier list (see Table 2). In one embodiment, if a switch receives two or more ACA requests (from different Commit Masters) at about the same time, one of the requests is accepted and the others are rejected. While the decision as to which request to accept is a matter of design choice, typical rules could include: first-received wins; first transmitted wins; that request corresponding to a switch having the lowest (highest) domain identifier wins. In another embodiment, a switch may accept (and execute) more than one update at a time. For example, a name service update and a zoning database update may be processed in tandem. In addition two (or more) name service or two (or more) zoning updates may be processed in tandem if they do not conflict. Once a slave switch accepts an ACA request in accordance with block 320, it begins to monitor the fabric for configuration changes. If the Commit Master is lost (the "yes" prong of diamond 325), a fail-over procedure in accordance with FIG. 4 may be pursued (block 330).

If the Commit Master is not lost (the "no" prong of 325), phase-two begins when a slave switch receives a SFC request from the Commit Master (block 335). As described earlier, in one embodiment the SFC request contains the data that will be used to update the target database. Accordingly, the slave switch can verify the data by, for example, performing a CRC check on the data payload (see Table 5). If the data is invalid (the "yes" prong of diamond 340), the slave issues a reject message (see Table 4) to the Commit Master (block 345). If the data is valid (the "no" prong of diamond 340), the slave switch issues an accept message (see Table 3) to the Commit Master (block 350). As before, if the Commit Master is lost (the "yes" prong of diamond 355), a fail-over procedure in accordance with FIG. 4 may be pursued (block 330).

Referring now to FIG. 3B, if the loss or failure of the Commit Master is not detected (the "no" prong of diamond 355), phase-three begins when a slave switch receives a UFC request from the Commit Master (block 360). Next, the slave switch issues an accept message (see Table 3) to the Commit Master (block 365) after which the database may be updated with the SFC supplied data (block 370). It will be recognized by one of ordinary skill in the art, that acts in accordance with blocks 365 and 370 may be done in reverse order. As before, if the Commit Master is lost (the "yes" prong of diamond 375), a fail-over procedure in accordance with FIG. 4 may be pursued (block 330).

If the loss or failure of the Commit Master is not detected (the "no" prong of diamond 375), phase-four begins when a slave switch receives an RCA request from the Commit Master (block 380). Each switch participating in the update operation, on receiving the Commit Master's RCA request issues an accept message (block 385) and releases those resources (e.g., buffers) that it allocated/acquired for the update operation and makes itself available for a new ACA request (block 390).

In an alternative embodiment, the Commit Master may provide indication in the UFC Request of an entry in the database to be updated (e.g., that entry in a Fibre Channel zoning database that should be updated with the data provided as part of the phase two SFC message). In this alternative embodiment, the slave switch identifies an entry(ies) in a target database that are to be updated. As part of the acts of block 360, each slave switch may verify that the identified entry exists in the target database and that, perhaps, the data received during phase-two is of the proper type for the identified entry. In this alternative embodiment, the slave switch does not update the entry in the database until after accepting the RCA request in phase-four. In addition, the RCA request from the Commit Master must be modified to provide a specific abort indication, rather than a normal termination indication, to distinguish from a normal termination RCA Request.

FIG. 4 illustrates fail-over process 400 in accordance with one embodiment of the invention. If a slave switch detects the loss of the Commit Master (block 405), it initiates a timer (or any interval detection means) to indicate the expiration of an interval that is a function of the slave switches position in the current phase's switch identifier list (block 410). That is, if the slave switch is the first switch in the switch identifier list, it may set its timer for 35 seconds, a combination of a base period, such as the fabric reconfiguration time, and a variable time for each switch. If the slave switch is the fourth switch in the current phases switch identifier list, it may set its timer for 50 seconds using the example combination approach. In the event of a fabric reconfiguration event each switch may determine those switches it is currently coupled to. This information may be used in conjunction with an ongoing Commit Process" switch identifier list to assist each switch in determining whether it should assume the role of Commit Master and/or how to set its timer value.

In one embodiment, the loss of a Commit Master is detected through the expiration of a specified time interval following a "last" received message from the Commit Master (block 415). In another embodiment, the loss of a Commit Master is detected through direct communication. That is, a switch is informed through a message from another switch that the Commit Master is no longer part of the fabric (or at least that segment of the fabric where the switch is). Other means of detecting the loss of a Commit Master will be recognized by one of ordinary skill in the art.

If a new Commit Master identifies itself before the slave switches timer expires (block 420), the slave switch clears the timer (block 435) and determines if the new Commit Master is in a less advanced phase than the slave switch (block 440). If not, this means that the new Commit Master is in the same phase or is more advanced than the slave switch, so the slave switch continues in accordance with FIG. 3 wherein it continues to receive Commit Process messages, albeit from a new Commit Master (block 445).

If the new Commit Master is less advanced than the slave switch, the request is rejected (block 450), preferably with a message indicating the more advanced state, and the slave switch waits to receive the transfer of ownership from the new Commit Master (block 455). At this time the slave switch now becomes the new Commit Master (block 425).

If a new Commit Master does not identify itself before the slave switches timer expires (the "no" prong of diamond 415), the slave switch assumes the role of Commit Master (block 425).

The new Commit Master reissues the current phase's message (block 430). For example, the new Commit Master will issue a SFC request if the current phase is phase-two, a UFC request if the current phase is phase-three and a RCA request if the current phase is phase-four. The new Commit Master then waits to see if all switches accept the request (block 460). If another switch receiving the request in accordance with block 430 is in a more advanced phase than that associated with the just reissued request (the "yes" prong of diamond 465), the "more advanced" switch would reject the request indicating it is in a more advanced stage of the Commit Process (see Table 4). On receiving the reject message, the New Commit Master would send a Transfer Commit Ownership (TCO) message to the rejecting switch (block 470) which would, in response, assume the role of the new Commit Master. The Commit Process would thereafter continue in accordance with FIG. 3 (block 470). Table 8 defines a TCO request in accordance with one embodiment of the invention.

TABLE 8

| TCO Request | |
|---|---|
| Item | Size (Bytes) |
| Constant value, e.g., 0 × 27 | 1 |
| Reserved | 1 |
| Message Length | 2 |
| Commit Exchange Preamble (see Table 2) | N |

If there is no switch in a more advanced phase (the "no" prong of diamond 465), the Commit Master determines if it is in phase-one (block 475). If so, the new Commit Master aborts the Commit Process by, for example, issuing an RCA message to all switches in the current phases switch identifier list (block 485). If the new Commit Master is not in phase-one, the Commit Process would thereafter continue in accordance with FIG. 2 with the new Commit Master controlling the process (block 480).

As described herein, techniques in accordance with the invention provide automatic fail-over during database update operations should a Commit Master be lost after initiating, but before completing, a database update operation. One of ordinary skill in the art will recognize that a Commit Master may be lost for a number of reasons. For example, the Commit Master could be lost due to a fabric reconfiguration event or because it experiences a hardware and/or software failure. Consider, for example, FIG. 5A which shows fabric 500 comprising fabric segment 505 (comprising switch 510 and, possibly, other devices not shown) and fabric segment 515 (comprising switch 520 and, possibly, other devices not shown) coupled by switch 525. If switch 525 initiates a database update operation such as a zone update, it assumes the role of Commit Master in accordance with FIG. 2. Should switch 525 be lost (for whatever reason) from fabric 500 during the update operation as illustrated in FIG. 5B, switch 510 could assume the role of Commit Master in segment 505, and switch 520 could assume the role of Commit Master in segment 515 in accordance with FIG. 4. As a result, each of fabric segments 505 and 515 could continue to provide zoning (through the replicated zoning database) services even if switch 525 should fail after initiating, but before completing, a database update operation. Thus, each fabric segment 505 and 515 would generate consistent databases so that the other devices (switches and/or end-devices such as a storage unit) could continue to function. In another scenario, the original Commit Master may be switch 510. Should switch 525 fail during the Commit Process, switch 510 could continue as the Commit Master for segment 505 and switch 520 could assume the role of Commit Master for segment 515 (following failure/loss of switch 525).

Referring now to FIG. 6, Fibre Channel switch 600 in accordance with one embodiment of the invention comprises Fibre Channel port circuit 605 for sending and receiving Fibre Channel signals, control circuit 610, that includes timer circuits 615, for controlling the operation of switch 600 and storage 620 that includes zoning database 625 and name service database 630. (Switch 600 could be, for example, switch 510, 520 and 525 in FIG. 5.) Instructions in accordance with FIGS. 2, 3 and 4 may be stored, for example, as library functions in storage 620. Storage 620, in turn, may be implemented by any device suitable for tangibly embodying program instructions such as Flash devices, Electrically Programmable Read Only Memory (EPROM) devices, Electrically Erasable Programmable Read Only Memory (EEPROM) devices and Programmable Read Only Memory (PROM) devices. Accordingly, zoning and name service databases 625 and 630 may be separate databases, or they may be separate collections of data within a common database, or they may represent common data associated with both zoning and name server services. Similarly, Fibre Channel port circuit 605, control circuit 610 and timers 615 may be implemented in a number of ways including, but not limited to, Application Specific Integrated Circuits (ASICs), Field Programmable Gate Arrays (FPGAs), one or more microcontrollers or microprocessors, Digital Signal Processors (DSPs), or a combination of one or more of these technologies adapted to retrieve and execute instructions from storage 620.

Various changes in the components as well as in the details of the illustrated operational methods are possible without departing from the scope of the claims. For example, one or ordinary skill in the art will recognize that timestamps may be used to track and record the issuance of Commit Process exchanges. In one embodiment, the Commit Master records the time it issues an ACA request as the Commit Processes "initiation time." This time could be used by other switches to prioritize update requests they receive at about the same time. In addition, methods in accordance with the invention may be performed in an order different from that illustrated in FIGS. 2, 3 and 4. For example: a Commit Master may receive a "reject" method before it determines whether any given slave switch is reachable (see FIG. 2); a slave switch may determine that the Commit Master has failed before or during other operations in accordance with FIG. 3; a slave switch may assume the role of Commit Master before its internal timer expires (see FIG. 4); and a slave switch may receive more than one "reject" message due to a plurality of switches being in a more advance phase (see FIG. 4). It will further be recognized by those of ordinary skill in the art that various state indicators may be used by a switch to track the current operational phase and other logistical information associated with the methods of FIGS. 2, 3 and 4. While the use of such state information may be involved and change from one implementation to another, it would nonetheless be within the ordinary skill of those in the art to recognize and implement such devices.

Additionally, while the replication of the zoning database is the preferred embodiment, other databases such as security, management or name server for example, could be replicated using the described techniques according to the present invention.

While the invention has been disclosed with respect to a limited number of embodiments and, in particular, to zoning database updates, numerous modifications and variations will be appreciated by those skilled in the art. Specifically, the methods of FIGS. 2, 3 and 4 apply with equal force to update operations for other distributed databases. For example, the described methods are equally applicable to name service database update operations. It is intended, therefore, that the following claims cover all such modifications and variations that may fall within the true sprit and scope of the invention.

The invention claimed is:

1. A fault tolerant method to update a Fibre Channel database, comprising:
   receiving at a first device a first message from a commit master;
   the first device detecting the loss of the commit master; and
   the first device resending the first message to each of a specified one or more devices if the first message or a prior message from the commit master includes update data, else aborting the update operation.

2. The method of claim 1, further comprising the first device updating an identified one or more entries in the Fibre Channel database with the update data.

3. The method of claim 2, wherein the Fibre Channel database comprises a zoning database.

4. The method of claim 2, wherein the Fibre Channel database comprises a name service database.

5. The method of claim 2, wherein the Fibre Channel database comprises a security database.

6. The method of claim 2, wherein the Fibre Channel database comprises a management database.

7. The method of claim 1, wherein the act of aborting comprises:
   identifying which of the specified one or more devices can receive an abort message; and
   sending the abort message to the identified one or more devices.

8. The method of claim 7, wherein the act of sending the abort message comprises sending a Release Change Authorization message.

9. The method of claim 1, wherein the act of receiving a first message comprises:
   receiving an Acquire Change Authorization message; and
   sending an accept message to the commit master.

10. The method of claim 1, wherein the act of receiving a first message comprises:
    receiving a Stage Fabric Configuration message; and
    sending an accept message to the commit master.

11. The method of claim 1, wherein the act of receiving a first message comprises:
    receiving an Update Fabric Configuration message; and
    sending an accept message to the commit master.

12. The method of claim 1, wherein the act of receiving a first message further comprises verifying the update data received as part of the first message.

13. The method of claim 1, wherein the act of receiving a first message comprises:
    receiving a first update message from a first switch and a second update message from a second switch;
    accepting one of the first or second update messages; and
    rejecting the other of the first or second update messages.

14. The method of claim 13, wherein the act of accepting comprises selecting that update message having an earlier timestamp.

15. The method of claim 13, wherein the act of rejecting comprises sending a reject message to that switch that sent the rejected update message.

16. The method of claim 1, wherein the act of detecting the loss of the commit master comprises failing to receive a second message from the commit master within a specified time period.

17. The method of claim 1, wherein the act of receiving a first message further comprises initiating an interval detection means and the act of detecting the loss of the commit master comprises detecting that the interval detection means has detected expiration of a specified time interval before a second message from the commit master was received.

18. The method of claim 1, wherein the act of resending the first message comprises:
    identifying which of the specified one or more devices can receive the resent message; and
    resending the first message to those identified one or more devices.

19. The method of claim 18, further comprising:
the first device receiving a second message from one of the identified one or more devices; and
the first device aborting the update operation specified in the resent message.

20. The method of claim 19, wherein the act of receiving a second message from one of the identified one or more devices comprises receiving a message indicating the sending device is in a more advanced phase of the update operation.

21. The method of claim 20, further comprising the first device transferring control of the update operation to that device that sent the second message.

22. A Fibre Channel switch, comprising:
a port for receiving and sending message signals;
database storage for storing at least a portion of a database;
a control unit for executing program instructions; and
storage, readable by the control unit, having instructions for causing the control unit to:
receive a first message from a commit master switch through the port,
detect the loss of the commit master switch, and
resend the first message through the port to each of a specified one or more Fibre Channel switches if the first message or a prior message from the commit master switch includes update data, else abort the update operation.

23. The Fibre Channel switch of claim 22, wherein the storage further comprises instructions for causing the control unit to update an identified one or more entries in the database storage with the update data.

24. The Fibre Channel switch of claim 23, wherein the database storage comprises a zoning database.

25. The Fibre Channel switch of claim 23, wherein the database storage comprises a name service database.

26. The Fibre Channel switch of claim 23, wherein the database storage comprises a security database.

27. The Fibre Channel switch of claim 23, wherein the database storage comprises a management database.

28. The Fibre Channel switch of claim 22, wherein the instructions for causing the control unit to abort comprise instructions for causing the control unit to:
identify which of the specified one or more Fibre Channel switches can receive an abort message; and
send the abort message to the identified one or more Fibre Channel switches.

29. The Fibre Channel switch of claim 28, wherein the instructions for causing the control unit to send the abort message comprise instructions to send a Release Change Authorization message.

30. The Fibre Channel switch of claim 22, wherein the instructions for causing the control unit to receive a first message comprise instructions to:
receive an Acquire Change Authorization message; and
send an accept message to the commit master switch through the port.

31. The Fibre Channel switch of claim 22, wherein the instructions for causing the control unit to receive a first message comprise instructions to:
receive a Stage Fabric Configuration message; and
send an accept message to the commit master switch through the port.

32. The Fibre Channel switch of claim 22, wherein the instructions for causing the control unit to receive a first message comprise instructions to:
receive an Update Fabric Configuration message; and
send an accept message to the commit master switch through the port.

33. The Fibre Channel switch of claim 22, wherein the instructions for causing the control unit to receive a first message comprise instructions to:
receive a first update message from a first switch and a second update message from a second switch;
accept one of the first or second update messages; and
reject the other of the first or second update messages.

34. The Fibre Channel switch of claim 33, wherein the instructions for causing the control unit to accept comprise instructions for causing the control unit to select that update message having an earlier timestamp.

35. The Fibre Channel switch of claim 33, wherein instructions for causing the control unit to reject comprise instructions for causing the control unit to send a reject message through the port to that switch that sent the rejected update message.

36. The Fibre Channel switch of claim 22, wherein the instructions for causing the control unit to detect the loss of the commit master switch comprise instructions for causing the control unit to detect the expiration of a specified time interval after receiving the first message and before receiving a second message from the commit master switch.

37. The Fibre Channel switch of claim 22, wherein the instructions to cause the control unit to resend comprise instructions for causing the control unit to:
identify which of the specified one or more Fibre Channel switches can receive the resent message; and
resend the first message through the port to those identified one or more Fibre Channel switches.

38. The Fibre Channel switch of claim 37, wherein the storage further comprises instructions for causing the control unit to:
receive a second message from one of the identified one or more Fibre Channel switches; and
abort the update operation specified in the resent message.

39. The Fibre Channel switch of claim 38, wherein the instructions for causing the control unit to receive a second message from one of the identified one or more Fibre Channel switches comprise instructions for causing the control unit to receive a message indicating the sending Fibre Channel switch is in a more advanced phase of the update operation.

40. The Fibre Channel switch of claim 39, wherein the storage unit further comprises instructions for causing the control unit to transfer control of the update operation to that device that sent the second message.

41. A digital network comprising:
a first switch adapted to initiate a database update operation;
a second switch communicatively coupled to the first switch, the second switch having database storage, a control circuit adapted to execute instructions, and a storage readable by the control circuit and having instructions encoded therein to cause the control circuit to:
receive a first message from the first switch,
detect the loss of the first switch,
resend the first message if the first message includes update data, else
abort the update operation.

42. The digital network of claim 41, wherein the storage further comprises instructions to cause the control circuit to update a specified one or more entries in a database with the update data.

43. The digital network of claim 42, wherein the database comprises a zoning database.

44. The digital network of claim 42, wherein the database comprises a name service database.

45. The digital network of claim 42, wherein the database comprises a security database.

46. The digital network of claim 42, wherein the database comprises a management database.

47. The digital network of claim 41, wherein the instructions to abort comprise instruction to cause the control circuit to send an abort message to a plurality of other switches.

48. The digital network of claim 47, wherein the instructions to abort comprise instructions to cause the control circuit to send a Release Change Authorization message.

49. The digital network of claim 41, wherein the instructions to receive a first message comprise instructions to:
receive an Acquire Change Authorization message; and
send an accept message to the first switch.

50. The digital network of claim 41, wherein the instructions to receive a first message comprise instructions to:
receive a Stage Fabric Configuration message; and
send an accept message to the first switch.

51. The digital network of claim 50, wherein the instructions to receive a Stage Fabric Configuration message further comprise instructions to verify the update data.

52. The digital network of claim 41, wherein the instructions to receive a first message comprise instructions to:
receive an Update Fabric Configuration message; and
send an accept message to the first switch.

53. The digital network of claim 41, wherein the instructions to receive a first message further comprise instructions to verify the update data received as part of the first message.

54. The digital network of claim 41, wherein the instructions to receive a first message further comprise instructions to:
receive a first update message from a third switch and a second update message from a fourth switch;
accept one of the first or second update messages; and
reject the other of the first or second update messages.

55. The digital network of claim 54, wherein the instructions to accept comprise instructions to select that update message having an earlier timestamp.

56. The digital network of claim 55, wherein the instructions to reject comprise instructions to send a reject message to that switch that sent the rejected update message.

57. The digital network of claim 41, wherein the instructions to detect the loss of the first switch comprise instructions to detect failing to receive a second message from the first switch within a specified time period.

58. The digital network of claim 41, wherein the instructions to receive a first message further comprise instructions to initiate a timer and the instructions to detect the loss of the first switch comprise instructions to detect that the timer expired before a second message from the first switch was received.

59. The digital network of claim 41, wherein the instructions further comprise instructions to:
receive a second message from a third switch, and
abort the update operation specified in the resent message.

60. The digital network of claim 59, wherein the instructions to receive a second message from a third switch comprise instructions to receive a message from the third switch that indicates the third switch is in a more advanced phase of the update operation.

61. The digital network of claim 60, wherein the instructions to receive a second message from a third switch further comprise instructions to transfer control of the update operation to the third switch.

* * * * *